US010387774B1

(12) United States Patent
Cao et al.

(10) Patent No.: US 10,387,774 B1
(45) Date of Patent: Aug. 20, 2019

(54) METHOD FOR NEUROMORPHIC IMPLEMENTATION OF CONVOLUTIONAL NEURAL NETWORKS

(71) Applicant: HRL Laboratories, LLC, Malibu, CA (US)

(72) Inventors: Yongqiang Cao, Newton, MA (US); Yang Chen, Westlake Village, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 879 days.

(21) Appl. No.: 14/609,775

(22) Filed: Jan. 30, 2015

Related U.S. Application Data

(60) Provisional application No. 61/933,713, filed on Jan. 30, 2014.

(51) Int. Cl.
*G06N 3/08* (2006.01)

(52) U.S. Cl.
CPC ..................................... *G06N 3/08* (2013.01)

(58) Field of Classification Search
None
See application file for complete search history.

(56) References Cited

PUBLICATIONS

Farabet, Clément, et al. "Hardware accelerated convolutional neural networks for synthetic vision systems." Circuits and Systems (ISCAS), Proceedings of 2010 IEEE International Symposium on. IEEE, 2010.*

Camuñas-Mesa, L., et al. "On scalable spiking ConvNet hardware for cortex-like visual sensory processing systems." Circuits and Systems (ISCAS), Proceedings of 2010 IEEE International Symposium on. IEEE, 2010.*

Maass, Wolfgang, and Henry Markram. "On the computational power of circuits of spiking neurons." Journal of computer and system sciences 69.4 (2004): 593-616.*

O'Connor, Peter, et al. "Real-time classification and sensor fusion with a spiking deep belief network." Frontiers in neuroscience 7 (2013).*

Farabet, Clément. Towards real-time image understanding with convolutional networks. Diss. Université Paris-Est, 2013.*

Cao, Yongqiang, Yang Chen, and Deepak Khosla. "Spiking deep convolutional neural networks for energy-efficient object recognition." International Journal of Computer Vision 113.1 (2015): 54-66.*

(Continued)

*Primary Examiner* — Li B. Zhen
*Assistant Examiner* — Daniel T Pellett
(74) *Attorney, Agent, or Firm* — Tope-McKay & Associates

(57) ABSTRACT

Described is a system for converting convolutional neural networks to spiking neural networks. A convolutional neural network (CNN) is adapted to fit a set of requirements of a spiking neural network (SNN), resulting in an adapted CNN. The adapted CNN is trained to obtain a set of learned weights, and the set of learned weights is then applied to a converted SNN having an architecture similar to the adapted CNN. The converted SNN is then implemented on neuromorphic hardware, resulting in reduced power consumption.

19 Claims, 6 Drawing Sheets

(56) References Cited

PUBLICATIONS

Matsugu, Masakazu, et al. "Convolutional spiking neural network model for robust face detection." Neural Information Processing, 2002. ICONIP'02. Proceedings of the 9th International Conference on. vol. 2. IEEE, 2002.*

Krizhevsky, Alex, Ilya Sutskever, and Geoffrey E. Hinton. "Imagenet classification with deep convolutional neural networks." Advances in neural information processing systems. 2012.*

Perez-Carrasco, Jose-Antonio, et al. "Spike-based convolutional network for real-time processing." Pattern Recognition (ICPR), 2010 20th International Conference on. IEEE, 2010.*

Cruz-Albrecht, J.M., Yung, M.W., & Srinivasa, N. (2012). Energy-efficient neuron, synapse and STDP integrated circuits. IEEE Trans on Biomedical Circuits and Systems, 6(3). 246-256.

Merolla, P., Arthur, J., Akopyan, F., Imam, N., Manohar, R., & Modha, D. S. (2011). A digital nourosynaptic core using embedded crossbar memory with 45 pi per spike in 45nm. In Custom Integrated Circuits Conference (CICC), 2011 IEEE (pp. 1-4).

Rumelhart, D. E., Hinton, G. E., & Williams, R. J. (1986). Learning representations by back-propagating errors. Nature, 323, 533-536.

Itti, L., (2013) "Neovision2 annotated video datasets," http://ilab.usc.edu/neo2/datasat/tower/training/ taken on Jan. 14, 2015.

Ciresan, D, Meier, U, and Schmidhuber, J (2012). Multi-column deep neural networks for image classification. In 2012 IEEE Conference on Computer Vision and Pattern Recognition (CVPR) (pp. 3642-3649).

Folowosele F, Vogelstein, RJ, and Etienne-Cummings, R (2011). Towards a cortical prosthesis: implementing a spike-based HMAX model of visual object recognition in silico. IEEE Journal on Emerging and Selected Topics in Circuits and Systems 1, 516-525.

Krizhevsky, A, Sutskever, I, and Hinton, G (2012), ImageNet classification with deep convolutional neural nekworks. In Advances in Neural Information Proessing Systems 25 (pp. 1106-1114).

LeCun, Y, Bottou, L, Berigio, Y, and Haffner, P (1998). Gradient-based learning applied to document recognition. Proceedings of the IEEE, 86(11), 2278-2324.

Masquelier, T and Thorpe, SJ (2007). Unsupervised learning of visual features through spike timing dependent plasticity, PLoS computational biology 3, 0247-0257.

Perez-Carrasco, JA, Serrano, C, Acha, B, Serrano-Gotarredona, T, and Linares-Barranco. B (2010). Spike-based convolutional network for real-time processing. In 2010 International Conference on Pattern Recognition (pp. 3085-3088).

Riesenhuber, M and Poggio, T (1990). Hierarchical models of object recognition in cortex. Nature Neurosci., 2(11), 1019-1025.

Serre T, Wolf, L, Bileschi, S, Riesenhuber, M, and Poggio, T (2007). Robust object recognition with cortex-like mechanisms. IEEE Trans. Pattern Anal. Mach. Intell., 29(3), 411-426.

Itti, L., Koch, K., and Niebur, E. (1998). A model of saliency-based visual attention for rapid scene analysis. IEEE Trans. on Pattern Analysis and Machine Intelligence, 20(11), pp. 1254-1259.

Itti, L. and Koch, K. (2000). A saliency-based search mechanism for overt and covert shifts of visual attention, , in Vision Research, 40, pp. 1489-1506.

Cruz-Albrecht, et al. (2012) "Energy efficient neuron, synapse and STDP integrated circuits" in IEEE Transactions on Biomedical Circuits and Systems, 6(3), pp. 246-256.

Merolla et. al (2014) "A million spiking-neuron integrated circuit with a scalable communication network and interface" in Science, vol. 345, Issue 6197, pp. 668-673.

* cited by examiner

METHOD FOR NEUROMORPHIC IMPLEMENTATION OF CONVOLUTIONAL NEURAL NETWORKS

GOVERNMENT LICENSE RIGHTS

This invention was made with government support under U.S. Government Contract Number W31P4Q-08-C-0264. The government has certain rights in the invention.

CROSS-REFERENCE TO RELATED APPLICATIONS

This is a Non-Provisional Application of U.S. Provisional Application No. 61/933,713, filed in the United States on Jan. 30, 2014, entitled, "Method for Neuromorphic Implementation of Convolutional Neural Networks."

FIELD OF INVENTION

The present invention relates to a system for converting convolutional neural networks to spiking neural networks and, more particularly, a system for converting convolutional neural networks to spiking neural networks for neuromorphic hardware implementations.

BACKGROUND OF THE INVENTION

A convolutional neural network (CNN) is a supervised deep-learning neural network with multiple layers of similarly structured convolutional feature extraction operations followed by a linear neural network (NN) classifier. A CNN is a supervised deep-learning neural network with multi-level convolution, nonlinearity and pooling layers. A CNN-like deep-learning neural networks have shown great performance advantages over other machine learning approaches to vision tasks.

CNN is a "rate"-based neural network, meaning that it is suitable for implementation on conventional central processing units (CPUs) with significant numerical floating-pointing capabilities. A neuromorphic architecture implemented with spiking neurons with CNN capability is highly desirable for vision tasks.

The spike-based HMAX-like method of Literature Reference No. 2 (see the List of Cited Incorporated Literature References) is an implementation of the original HMAX algorithm (see Literature Reference Nos. 7 and 8), and does not teach a principled approach for conversion of general HMAX architecture to spike implementation, much less CNN architectures. In Literature Reference No. 5, the authors use STDP-like unsupervised methods to learn pre-classification features, then use non-spiking classifier on these features.

The frameless spike-based convolution network (described in Literature Reference No. 6) exploits AER (address event representation) for spike communication, and employs kernel projection to implement convolution computation. Although this approach can achieve fast input-to-output response time, it requires massive amount of digital hardware resources (such as memory and accumulator for map integration) which has not yet shown any benefit in power savings. There is also no good solution to implement sigmoid function in Literature Reference No. 6. Therefore, it is difficult to fully implement a CNN.

Thus, a continuing need exists for converting convolutional neural networks to spiking neural networks.

SUMMARY OF THE INVENTION

The present invention relates to system for converting convolutional neural networks to spiking neural networks and, more particularly, a system for converting convolutional neural networks to spiking neural networks for neuromorphic hardware implementations. The system comprises one or more processors and a memory having instructions such that when the instructions are executed, the one or more processors perform multiple operations. The system trains an adapted convolutional neural network (CNN) to obtain a set of learned weights, the adapted CNN having an architecture that is adapted to fit a set of requirements of a spiking neural network (SNN). The set of learned weights is applied to a converted SNN having an architecture similar to the adapted CNN. The converted SNN then is implemented on neuromorphic hardware.

In another aspect, at least one input is processed with the converted SNN until an expected output is obtained, wherein if an expected output is not obtained, then a set of parameters in the converted SNN is adjusted until the expected output is obtained.

In another aspect, the CNN comprises a pre-processing phase, a plurality of convolutional levels, and a spatial linear classification layer. Each convolution level in the plurality of convolution levels has a plurality of layers, having output values, comprising a convolution layer, a sigmoid function layer, and a spatial max-pooling layer. To adapt the CNN to fit the set of requirements of a SNN, output values in the plurality of layers are made positive; biases are removed from the convolution layers; and the spatial max-pooling layers are replaced with spatial linear subsampling layers.

In another aspect, the output values in the plurality of layers are made positive by adding an abs( ) function after the pre-processing phase to ensure that input values to a convolution layer following the pre-processing phase are all non-negative, and replacing the sigmoid function layer with a HalfRect( ) layer.

In another aspect, the converted SNN is comprised of a pre-processing phase, a spike generation module, a plurality of convolution layers, a plurality of spatial linear subsampling layers, a spatial linear classification layer, and a spike counter module.

In another aspect, the spike counter module generates a classification output corresponding to a category neuron in the converted SNN which has a maximum number of spikes in the spatial linear classification layer.

In another aspect, the at least one input is an image, and the expected output is a classification output for the image.

In another aspect, the neuromorphic hardware comprises at least one neuromorphic chip.

In another aspect, the present invention comprises a neuromorphic hardware chip programmed with a converted spiking neural network (SNN) having a set of learned weights obtained by training an adapted convolutional neural network (CNN) having an architecture that is adapted to fit a set of requirements of a SNN.

In another aspect, the present invention also comprises a method for causing a processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
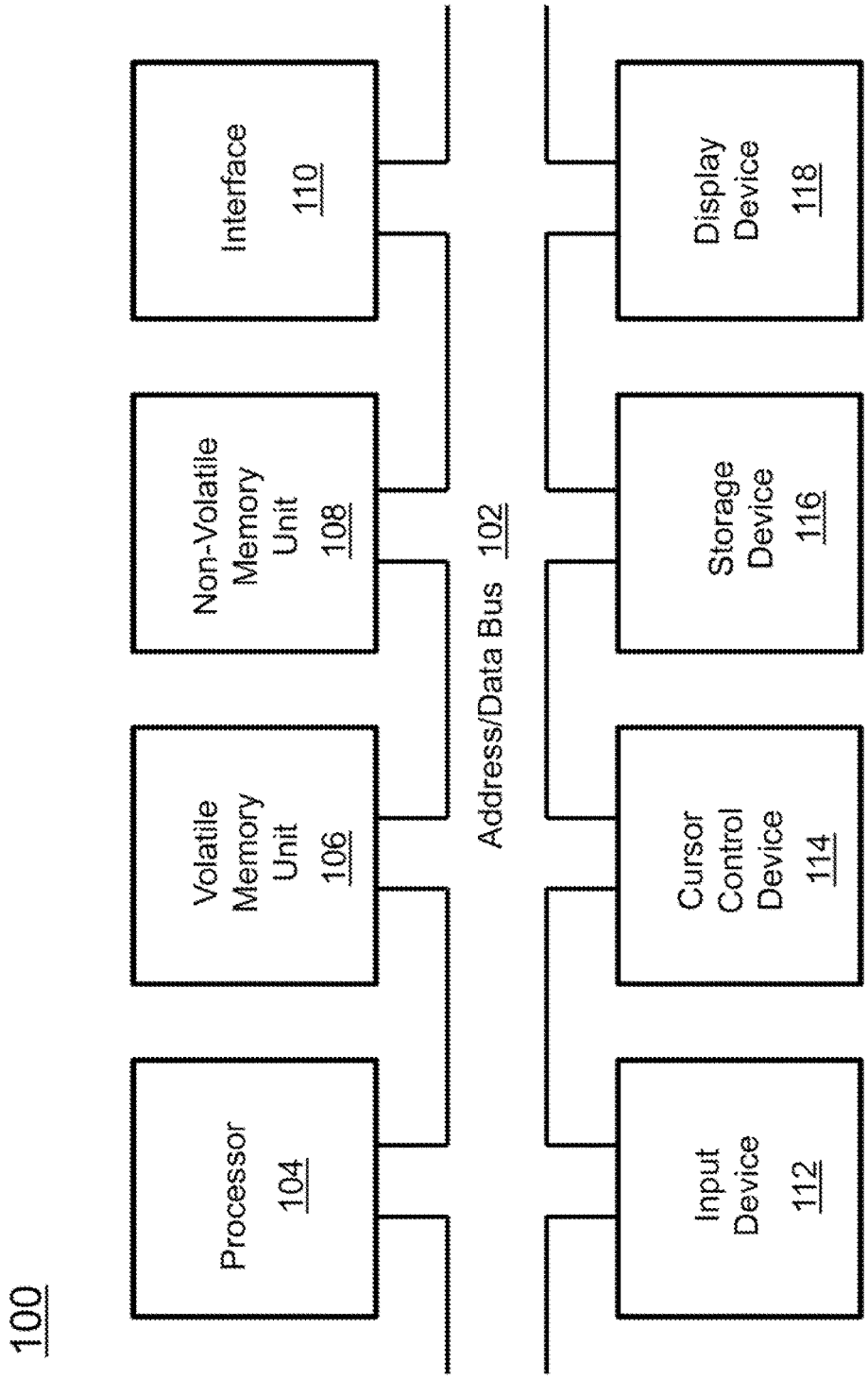
FIG. 1 is a block diagram depicting the components of a system for converting convolutional neural networks (CNN) to spiking neural networks according to the principles of the present invention.

The present invention relates to a system for converting convolutional neural networks to spiking neural networks and, more particularly, a system for converting convolutional neural networks to spiking neural networks for neuromorphic hardware implementations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Ciresan, D, Meier, U, and Schmidhuber, J (2012). Multi-column deep neural networks for image classification. In 2012 IEEE Conference on Computer Vision and Pattern Recognition (CVPR), 3642-3649.
2. Folowosele F, Vogelstein, R J, and Etienne-Cummings, R (2011). Towards a cortical prosthesis: implementing a spike-based HMAX model of visual object recognition in silico. IEEE Journal on Emerging and Selected Topics in Circuits and Systems 1, 516-525.
3. Krizhevsky, A, Sutskever, I, and Hinton, G (2012). ImageNet classification with deep convolutional neural networks. In Advances in Neural Information Processing Systems 25 (pp. 1106-1114).
4. LeCun, Y, Bottou, L, Bengio, Y, and Haffner, P (1998). Gradient-based learning applied to document recognition. Proceedings of the IEEE, 86(11), 2278-2324.
5. Masquelier, T and Thorpe, S J (2007). Unsupervised learning of visual features through spike timing dependent plasticity. PLoS computational biology 3, 0247-0257.
6. Perez-Carrasco, J A, Serrano, C. Acha, B, Serrano-Gotarredona, T, and Linares-Barranco, B (2010). Spike-based convolutional network for real-time processing. In 2010 International Conference on Pattern Recognition, 3085-3088.
7. Riesenhuber, M and Poggio, T (1999). Hierarchical models of object recognition in cortex. Nature Neurosci., 2(11), 1019-1025.
8. Serre T, Wolf, L, Bileschi, S, Riesenhuber, M. and Poggio, T (2007). Robust object recognition with cortex-like mechanisms. IEEE Trans. Pattern Anal. Mach. Intell., 29(3), 411-426.
9. Cruz-Albrecht, J. M., Yung, M. W., & Srinivasa, N. (2012). Energy-efficient neuron, synapse and STDP integrated circuits. IEEE Trans. on Biomedical Circuits and Systems, 6(3), 246-256.
10. Merolla, P., Arthur, J., Akopyan, F., Imam, N., Manohar, R., & Modha, D. S. (2011). A digital neurosynaptic core using embedded crossbar memory with 45pj per spike in 45 nm. In Custom Integrated Circuits Conference (CICC), 2011 IEEE (pp. 1-4).
11. Rumelhart, D. E., Hinton, G. E., & Williams, R. J. (1986). Learning representations by back-propagating errors. Nature, 323, 533-536.
12. Itti, L., (2013) "Neovision2 annotated video datasets," available at http://ilab.usc.edu/neo2/dataset/ taken on Jan. 14, 2015.

The present invention has three "principal" aspects. The first is a system for converting convolutional neural networks to spiking neural networks. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HIDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
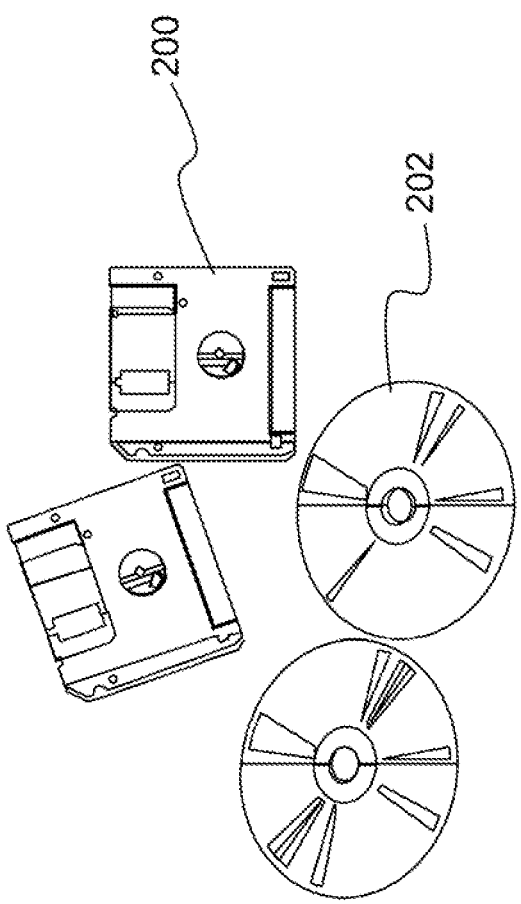
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The convolutional neural network (CNN) is a supervised deep-learning neural network with multiple layers of similarly structured convolutional feature extraction operations followed by a linear neural network (NN) classifier. Each of the convolution layers is composed of linear filtering (convolution), non-linearity, and feature pooling stages, as described in Literature Reference No. 4. The linear NN classifier is a fully connected NN, and can have one or more hidden layers itself.

CNN-like deep-learning neural networks have shown great performance advantages over other machine learning approaches to vision tasks. For example, a team in University of Toronto Deep Learning Group won the ILSVRC-2012 competition in the ImageNet Large Scale Visual Recognition Challenge (see Literature Reference No. 3). Ciresan et al. (see Literature Reference No. I) won the final phase of the German traffic sign recognition benchmark and achieved a better-than-human recognition rate of 99.46%.

A CNN is a "rate"-based neural network, meaning that it is suitable for implementation on conventional central processing units (CPUs) with significant numerical floating-pointing capabilities. A neuromorphic architecture implemented with spiking neurons with CNN capability is highly desirable for vision tasks. A big advantage in doing so is that the neuromorphic architecture communicates and computes with spikes like a network of neurons in the human brain, and thus consumes much less energy. The spiking CNN neuromorphic architecture described is amenable to be implemented in emerging neuromorphic hardware (such as those built under the DARPA SyNAPSE program by HRL and IBM, see Literature Reference Nos. 9 and 10) with very low power consumption. Energy consumption is a big problem in conventional vision algorithms that are becoming more and more complex requiring most powerful computers (CPUs+graphics processing units (GPUs)) or even computer clusters to run, thus limiting their practical applications. Neuromorphic implementations of vision algorithms can be made with extremely small size, weight and power consumptions (SWaP), opening up the doors to numerous potential application areas.

(4) Specific Details of the Invention

Figure 3:
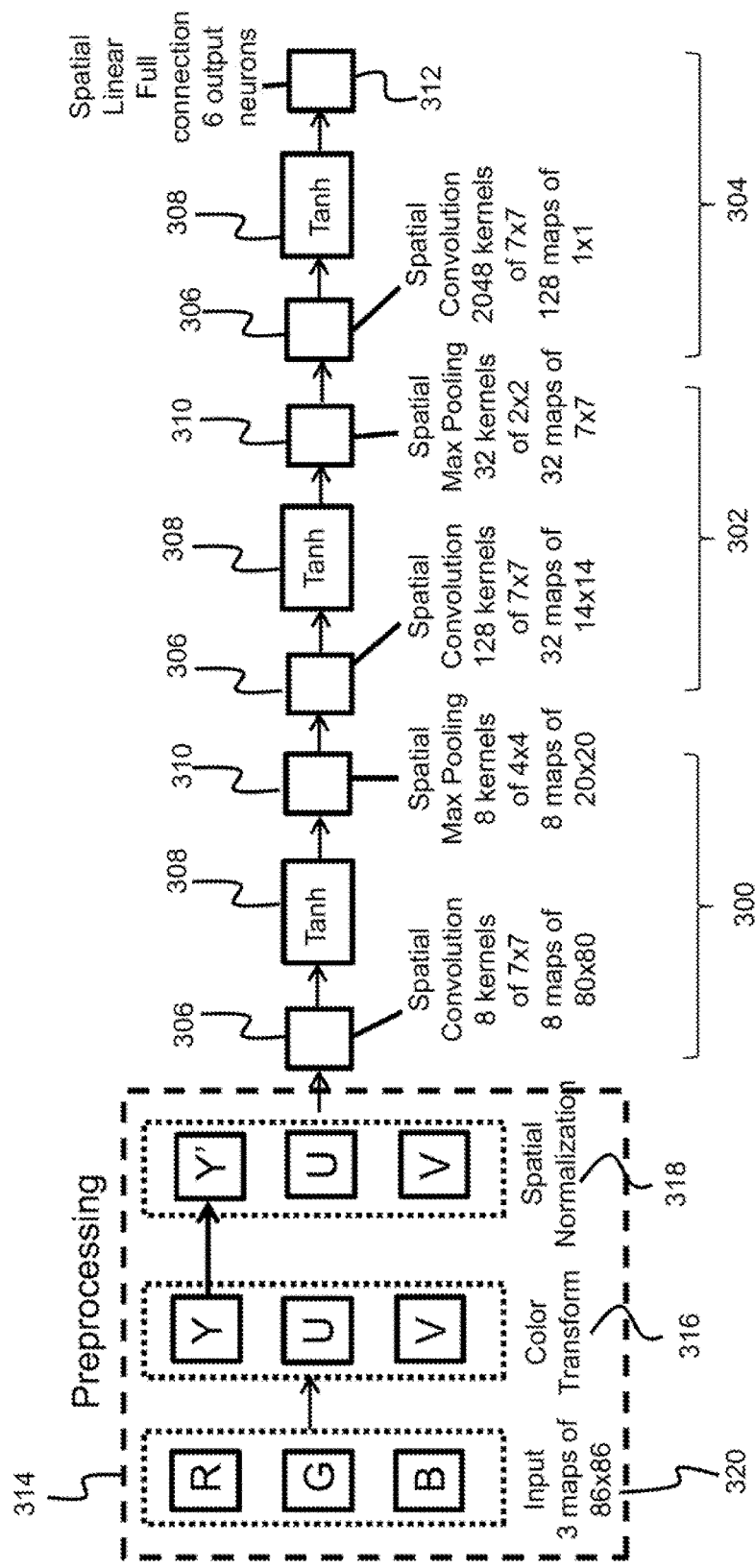
FIG. 3 is an illustration of a typical CNN architecture.

FIG. 3 illustrates a typical CNN architecture. It has three convolution levels (a first convolution level 300, a second convolution level 302, and a third convolution level 304), where each of the convolution levels has three layers. The first layer is a spatial convolution layer 306 consisting of a bank of filters, and the second layer is a point-wise nonlinear sigmoid function layer 308 typically implemented by a Tan h( ) function. Spatial convolution is a two-dimensional linear filtering with a set of filtering kernels for all neurons producing a set of feature maps. Tan h( ) is the hyperbolic tangent function, which is a standard way to model neuron output activation in a CNN. The third layer of the convolution levels is a spatial max-pooling layer 310, which takes the maximum output values over a small image regions in the input feature maps produced by the non-linearity layers.

In the example shown in FIG. 3, the third convolution level 304 does not have a max-pooling layer, a coincidence due to the choice of architecture parameters. Finally, the last level (the third convolution level 300 in this example) of the CNN has a fully connected linear classification layer 312 with one or more hidden layers in itself. The whole network can be trained using a standard error back-propagation algorithm with a stochastic gradient descent. The goal of training is to adjust the system parameters (the convolution kernel weights and biases) so that the output of the CNN predicts the class (label) when an unknown input image is presented as the input.

As described above, it is desirable to convert an existing design of a CNN into a neuromorphic hardware implementation, such as implementation in neuromorphic chips, to reduce power consumption. There are two conceivable approaches to converting such a CNN into a spiking neuromorphic architecture. One is to train a spiking network with CNN-like architecture directly. Although there are some STDP-like spiking learning rules to train a spiking neural network in a self-organized, unsupervised way, this line of research is in its infancy, and it is still unclear how to train a deep spiking neural network effectively to achieve a higher level function, for example, classification with supervised learning.

Figure 5:
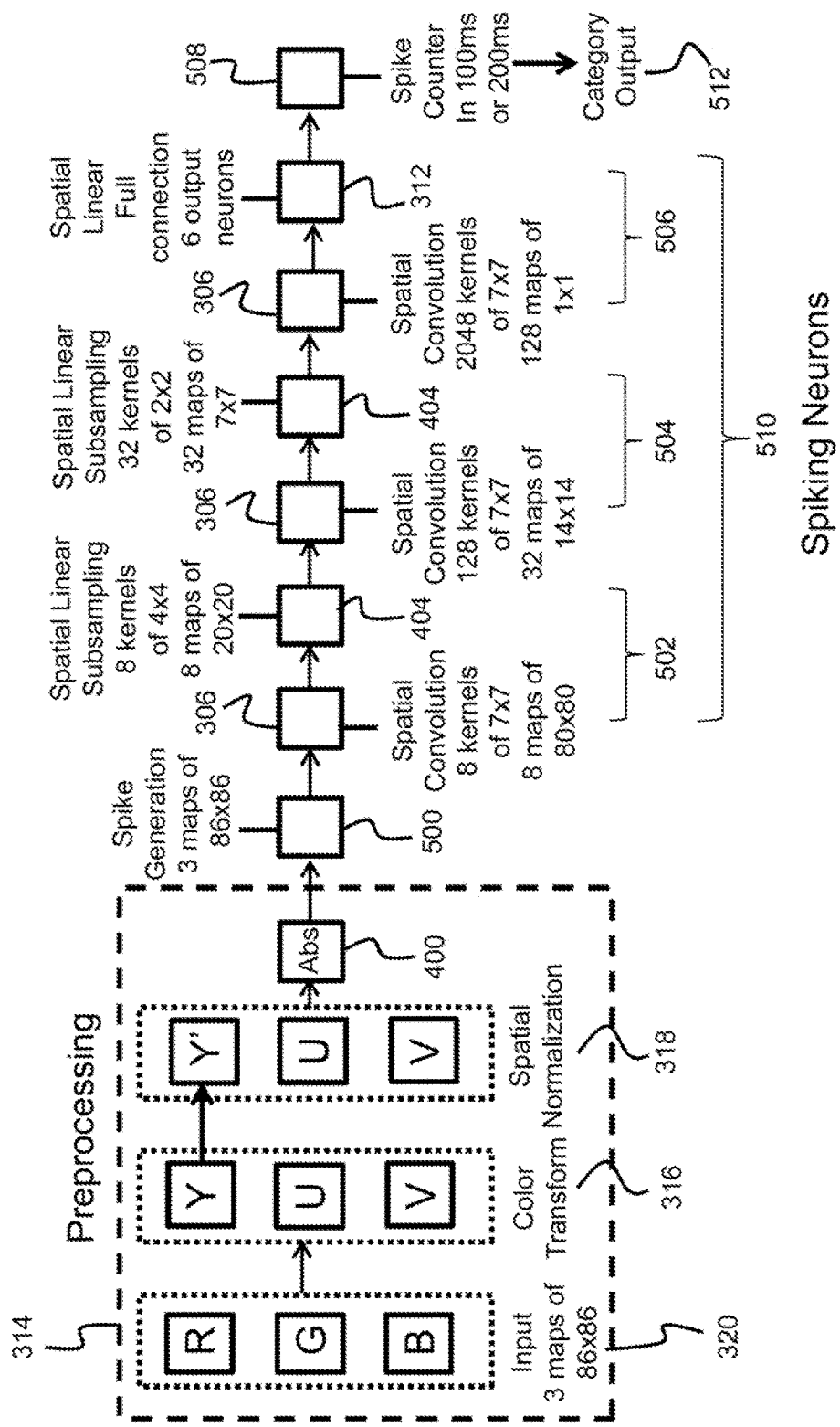
FIG. 5 is an illustration of a spiking CNN architecture according to the principles of the present invention.
Figure 6:
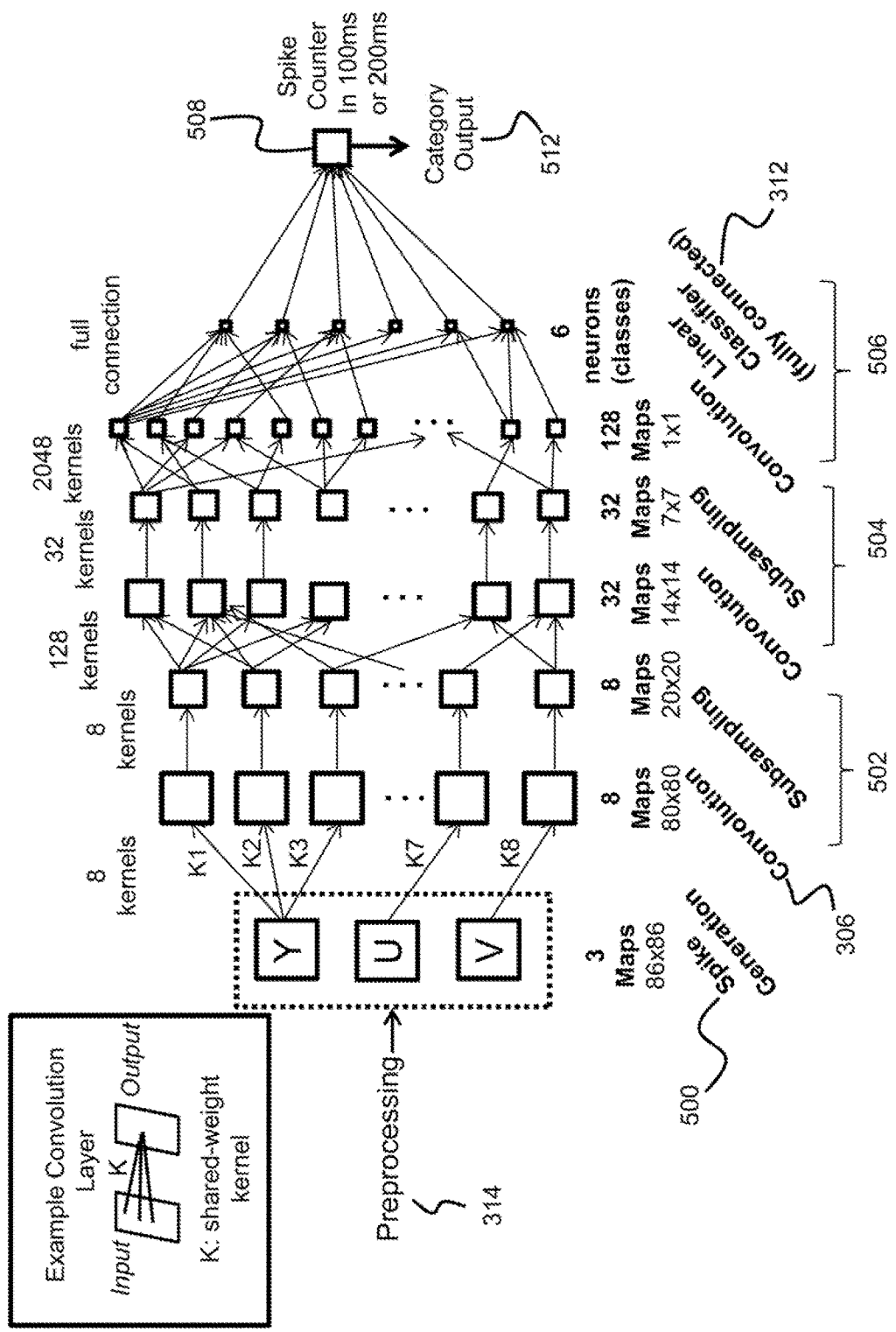
FIG. 6 is an illustration of a detailed spiking CNN architecture according to the principles of the present invention.

The other possible approach is to train the rate-based CNN, then apply the learned weights to a spiking neural network with a similar architecture as the trained CNN. The main challenge here is that it may cause unacceptable accuracy loss in classification when doing the conversion of network from CNN to a spiking neural network (SNN) directly. It was actually this case when a typical CNN architecture, as shown in FIG. 3, was converted into a spiking architecture, as shown in FIGS. 5 and 6. There are several reasons. For instance, negative values in CNN are more difficult to represent in a SNN. The negative values come from the sigmoid function Tan h( ) having output values between −1 and 1. Additionally, in each convolution level (300, 302, 304), the output values are weighted sums of inputs plus biases. Weights and biases can both be negative causing the output value to be negative. Further, output values from a preprocessing phase 314 (e.g., color transform 316, spatial normalization 318) of an input RGB (red, green, blue) image 320 can produce negative values. Though it is possible to represent negative values in a spiking network with inhibitory neurons, it will double the number of neurons and make the whole network much more complicated. Increasing the neuron count means requiring more hardware resources and power.

Another reason for unacceptable accuracy loss in classification when doing the conversion of network from a CNN to a SNN is there is no good way to represent biases in spiking networks as in a CNN. The biases in each layer (e.g., 306) of a convolution level (e.g., 300, 302, 304) can be positive or negative, which cannot be represented easily in a SNN.

Finally, max-pooling requires two layers of spiking networks. In a CNN, spatial max-pooling is implemented as taking the maximum output values over small image regions in the input. In a SNN, one has to use two-layer neural networks with lateral inhibition first and then pooling over these small image regions. This approach requires more neurons and can cause accuracy loss due to added complexity.

Figure 4:
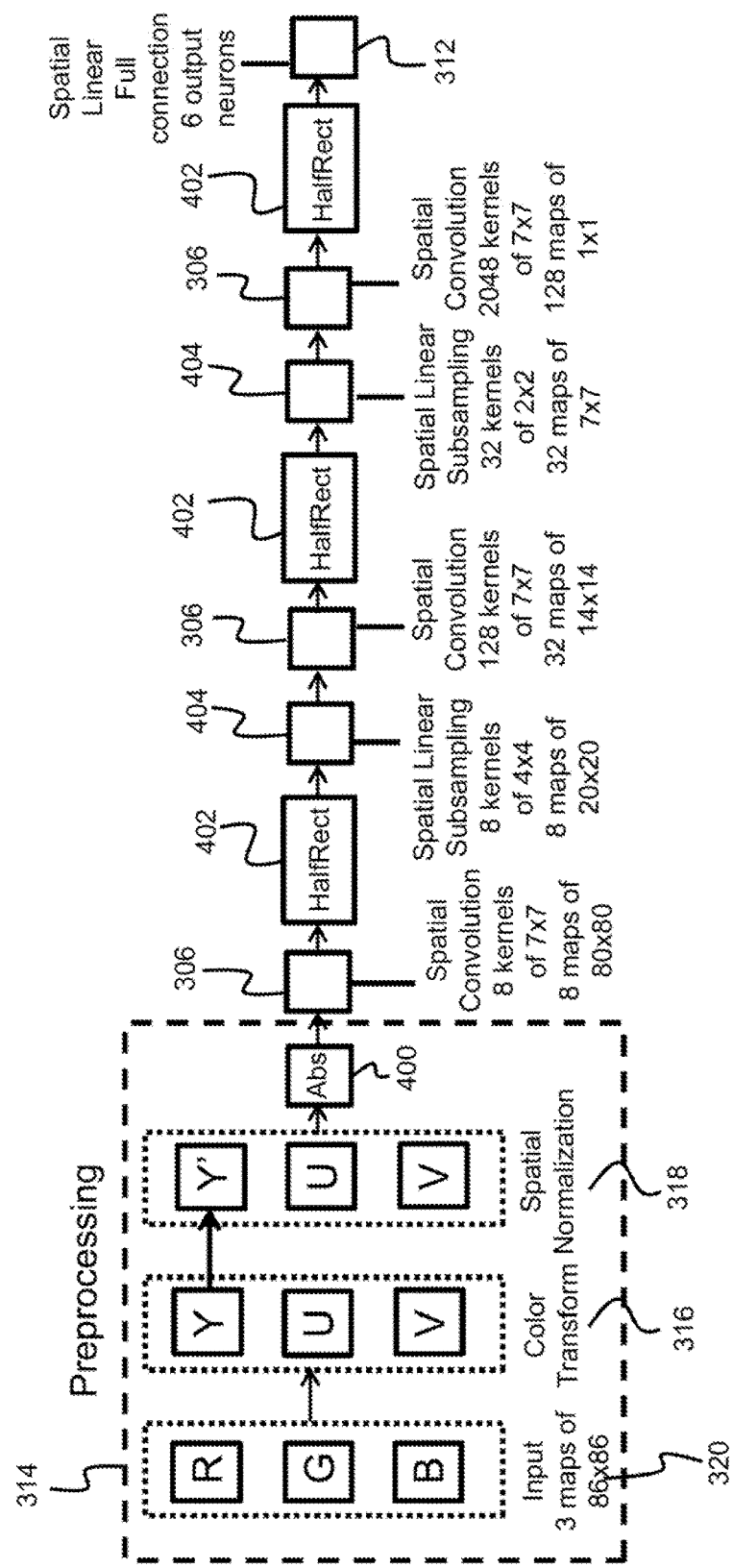
FIG. 4 is an illustration of an adapted CNN architecture according to the principles of the present invention.

The system according to the principles of the present invention adapts the CNN architecture to fit the requirements of spiking neural networks, as depicted in FIG. 4. Then, the adapted CNN is trained and the learned weights are applied to a spiking network with an architecture similar to the adapted CNN. More specifically, to fit the requirement of a SNN the following changes are made. Output values in all layers are made positive by adding an abs( ) function layer 400 after the preprocessing phase 314 which includes color transform 314 and spatial normalization 316. The abs ( ) function layer 400 ensures the input values to the first layer 306 are all non-negative.

Another way output values in all layers are made positive is by changing the sigmoid function layer (after spatial convolution) from Tan h( ) to a HalfRect function layer 402: HalfRect( ). HalfRect(x) is defined as: HalfRect(x) max(x, 0).

For a justification for using max(x,0) instead of a sigmoid function, see Literature Reference No. 3, where they showed that the non-saturating non-linearity, such as max(x,0), converges faster than the saturating non-linearity function such as Tan h(x). There is another advantage to using a HalfRect function layer 402 instead of Tan h: HaltRect(x) is linear when x is positive, which minimizes the accuracy loss when converting a CNN into a SNN architecture.

An additional change made to fit the requirement of a SNN was to remove biases from all convolution layers. A simple implementation without changing existing code is to reset all bias values to zero after each training iteration.

Finally, using spatial linear subsampling 404 instead of spatial max-pooling is a change made to fit the requirement of a SNN. Here, spatial linear subsampling 404 adds all pixels over a small image region using a kernel of uniform weights which sum to 1.0. A spatial linear subsampling 404 function can be converted to spiking networks easily.

FIG. 5 illustrates a non-limiting example of the converted SNN architecture in block diagram, and FIG. 6 depicts a non-limiting example of the SNN architecture in detail according to the principles of the present invention. The converted SNN is processed with at least one input (an image in this non-limiting example) until an expected output (e.g., category output 512) is obtained. The converted SNN is then able to be implemented on neuromorphic hardware, such as that described in Literature Reference Nos. 9 and 10.

The converted SNN architecture of FIGS. 5 and 6 consists of a preprocessing phase 314, a spike generation module 500, first spatial convolution and linear subsampling layers 502, second convolution and linear subsampling layers 504, third convolution and linear classification layers 506, and a spike counter module 508. The connections in the three convolution layers/levels (502, 504, 506) are similar to those in the adapted CNN architecture (shown in FIG. 4) except in the SNN, HalfRect function layers are not included as they are in the adapted CNN. The HalfRect function layers are implied properties of the spiking neurons 510, and are, therefore, omitted in the SNN architecture. The membrane potential V(t) of a spiking neuron in the SNN architecture is updated in each time step by the following equation according to the integrate-and-fire neuron model:

$$V(t+1)=V(t)+L+X(t), \qquad (1)$$

where L is the (constant) leakage parameter, X(t) is the summed input at time t from all synapses connected into the spiking neuron. Whenever V(t) exceeds its threshold e, the neuron fires and produces a spike. Then its membrane potential V(t) is reset to zero.

For example, for a neuron (i,j) in a convolution map in the first convolution layer 306 in FIG. 6, X(t) can be defined as:

$$X_{ij}(t) = \sum_{p,q=-3}^{3} A_{p+i,q+j}(t) K_{pq}, \qquad (2)$$

where $A_{p+i,q+j}(t)$ are the input spikes (0 or 1) that come from the previous layer, and $K_{pq}$ is the weight (or coefficient) of convolution kernel of size 7×7 that is shared by all neurons in the same map.

Table 1 below shows the leakage and firing threshold parameters of integrate-and-fire neurons (see equation (1)) that were used in the spiking CNN simulator. These parameters are the same for all neurons in the same layer. If an expected output is not obtained during processing of the converted SNN, a set of parameters (e.g., parameters in Table 1) is adjusted until the expected output is obtained.

TABLE 1

Parameters of Spiking Neurons in SNN Simulator

| | Leakage (L) | Firing Threshold (θ) |
|---|---|---|
| 1st Convolution Layer | 0 | 10 |
| 1st Subsampling Layer | 0 | 0.99 |
| 2nd Convolution Layer | 0 | 1 |
| 2nd Subsampling Layer | 0 | 0.99 |
| 3rd Convolution Layer | 0 | 1 |
| Linear Classification Layer | 0 | 1 |

The spiking neuron model in equation (1) can be implemented in SyNAPSE chips, and, hence, it enables the spiking CNN architecture described in FIGS. 5 and 6 to be implemented directly in SyNAPSE chips. The method according to the principles of the present invention does not limit itself to the integrate-and-fire spiking neuron model defined in equation (1), and it is suitable to use other models for spiking neurons in the SNN architecture described herein. However, the activation function HalfRect( ) in the adapted CNN may need to be adapted to the special property of the new spiking neuron model.

The spike generation module 500 is defined as follows. Let $I_{ijk}$'s (k=1, 2, 3) be the image maps that input to the spike generation layer 500. At time t, neuron (i,j) in the kth image map produces a spike if rand( )<$cI_{ijk}$, where rand( ) is a random number generator with uniform distribution on (0,1), and c is a constant to scale the frequency of spikes generated. As a non-limiting example, c=1/3 was used in the simulations described below, where initial input RGB (red, green, blue) images (see FIG. 5) were normalized into [0,1].

The spike counter module 508 counts spikes of all category neurons (6 in the example shown in FIG. 6) in the linear classification layer 312 in certain time steps (e.g., 100 or 200) from the start of presentation of the input image, then produces a category output 512 (classification result) corresponding to the neuron which has the maximum number of spikes.

The adapted CNN depicted in FIG. 4 was trained using an error back-propagation with stochastic gradient descent algorithm (see Literature Reference No. 11). Then the learned weights were applied to the SNN architecture described in FIGS. 5 and 6. The architecture was tested by comparing its performance against a regular (not adapted) CNN trained using the same training data. The images in the test set are completely new images not used in training. Before each test image was presented to the SNN, all the neurons were reset so their membrane voltage (V) is zero, and the counters in the spike counter 508 were cleared. The SNN simulation (written in MATLAB) runs at 1 millisecond (ms) simulation time step for 100 steps, the spikes at the spike counter module 508 were counted, and the class of the input image was declared as 1 of those 6 pre-defined classes. Then the neurons are reset and counters cleared before the next image is processed, until all images are processed this way for a test set. The same experiments have been carried out using a regular CNN with the best performance at the time. After all test images were processed this way, a confusion matrix was constructed, as shown in Tables 2 to 5 below, for each of the test cases. Note that the purpose of running an SNN converted from a CNN is to show its performance potential, and to collect statistics to enable estimation of potential power savings when the SNN is implemented in spiking neuromorphic hardware (e.g., neuromorphic chips), as described below.

Close to 99% global testing accuracy in Stanford Tower Summative data sets (see Literature Reference No. 12) "026" and "027" (using image windows extracted based on ground truth) was achieved, which is comparable to the performance of the corresponding CNN. However, the estimated energy consumption of the trained SNN, if it were implemented in the emerging spiking neuromorphic hardware (see Literature Reference No. 9 and 10), is far below (more than 2 orders of magnitude below) its rate-based counterpart, demonstrating the potential power savings of the SNN design according to the principles of the present invention.

Tables 2-5 below show the test results comparing a regular CNN vs. the SNN implementation of the adapted CNN. Each is a confusion matrix using one implementation on a set of images from sequence "026" or "027" of the Summative Test data set. The labels in the first column of the tables indicate the truth categories of the images corresponding to the test samples shown in the corresponding rows, while the labels in the first row show the categories of the images as they are classified, or the result, for the corresponding column. The value entries in the center of the tables show the number of test images with truth categories (rows) classified as the result category (column). The rightmost column is the "% accuracy" which is the percentage resulting from dividing the values in diagonal of a corresponding row by the total of that row. Global correct value is the weighted sum of the % accuracies.

TABLE 2

Confusion matrix for CNN result on summative data set "026"

| | Non-target | Bus | Car | Cyclist | Person | Truck | % Accuracy |
|---|---|---|---|---|---|---|---|
| Non-target | 1492 | 0 | 7 | 6 | 3 | 0 | 98.94% |
| Car | 0 | 0 | 990 | 0 | 0 | 0 | 100% |
| Cyclist | 4 | 0 | 0 | 478 | 5 | 0 | 98.15% |
| Person | 4 | 0 | 1 | 2 | 955 | 0 | 99.27% |
| | | | | | | Global Correct: | 99.19% |

TABLE 3

Confusion matrix for SNN result on summative data set "026" (T = 100 ms)

| | Non-target | Bus | Car | Cyclist | Person | Truck | % Accuracy |
|---|---|---|---|---|---|---|---|
| Non-target | 1507 | 0 | 0 | 0 | 1 | 0 | 99.93% |
| Car | 10 | 0 | 980 | 0 | 0 | 0 | 98.99% |
| Cyclist | 23 | 0 | 1 | 463 | 0 | 0 | 95.07% |
| Person | 14 | 0 | 5 | 8 | 935 | 0 | 97.19% |
| | | | | | | Global Correct: | 98.43% |

TABLE 4

Confusion matrix for CNN result on summative data set "027"

| | Non-target | Bus | Car | Cyclist | Person | Truck | % Accuracy |
|---|---|---|---|---|---|---|---|
| Non-target | 1339 | 0 | 2 | 2 | 2 | 0 | 99.55% |
| Car | 0 | 0 | 871 | 0 | 0 | 0 | 100% |
| Cyclist | 0 | 0 | 0 | 683 | 0 | 0 | 100% |
| Person | 0 | 0 | 0 | 1 | 1313 | 0 | 99.92% |
| | | | | | | Global Correct: | 99.83% |

TABLE 5

Confusion matrix for SNN result on summative data set "027" (T = 100 ms)

| | Non-target | Bus | Car | Cyclist | Person | Truck | % Accuracy |
|---|---|---|---|---|---|---|---|
| Non-target | 1345 | 0 | 0 | 0 | 0 | 0 | 100% |
| Car | 0 | 0 | 871 | 0 | 0 | 0 | 100% |
| Cyclist | 0 | 0 | 0 | 683 | 0 | 0 | 100% |
| Person | 0 | 0 | 0 | 30 | 1284 | 0 | 97.72% |
| | | | | | | Global Correct: | 99.29% |

In summary, the system according to the principles of the present invention allows one to convert a CNN architecture into an SNN architecture that can be readily implemented in spiking neuromorphic hardware (e.g., neuromorphic chips) without performance loss. The power consumption of such an SNN implementation with the emerging neuromorphic hardware is far below (more than 2 orders of magnitude lower than) its rate-based counterpart run on conventional CPU hardware. Therefore, with the present invention, one can achieve state-of-the-art image/video recognition performance while consuming orders of magnitude less power.

Several commercial products could benefit from image recognition technology using the present invention, non-limiting examples of which include face recognition, video collision avoidance/pedestrian detection in vehicles, and video surveillance applications.

What is claimed is:

1. A system for converting convolutional neural networks to spiking neural networks for image recognition in a vehicle, comprising:

one or more processors and a non-transitory computer-readable medium having executable instructions encoded thereon, such that upon execution of the instructions, the one or more processors perform operations of:

training an adapted convolutional neural network (CNN) comprising a plurality of layers, having output values, to obtain a set of learned weights, the adapted CNN having an architecture that is adapted to fit a set of requirements of a spiking neural network (SNN), wherein to adapt the CNN to fit the set of requirements of the SNN, the output values in the plurality of layers are made non-negative;

applying the set of learned weights to a converted SNN having an architecture similar to the adapted CNN; and classifying an input image captured proximate the vehicle using the converted SNN.

2. The system as set forth in claim 1, wherein the one or more processors further perform an operation of processing the converted SNN with the at least one input image until an expected output is obtained, wherein if an expected output is not obtained, then a set of parameters in the converted SNN is adjusted until the expected output is obtained.

3. The system as set forth in claim 2, wherein the CNN comprises a pre-processing phase, a plurality of convolutional levels, and a spatial linear classification layer, wherein each convolution level in the plurality of convolution levels comprises a convolution layer, a sigmoid function layer, and a spatial max-pooling layer, wherein to adapt the CNN to fit the set of requirements of a SNN, the method further comprises acts of:

removing biases from the convolution layers; and replacing the spatial max-pooling layers with spatial linear subsampling layers.

4. The system as set forth in claim 3, wherein to make the output values in the plurality of layers positive, the system further performs an operation of:

adding an abs( ) function after the pre-processing phase to ensure that input values to a convolution layer following the pre-processing phase are all non-negative.

5. The system as set forth in claim 4, wherein the converted SNN is comprised of a pre-processing phase, a spike generation module, a plurality of convolution layers, a plurality of spatial linear sub-sampling layers, a spatial linear classification layer, and a spike counter module.

6. The system as set forth in claim 5, wherein the spike counter module generates a classification output corresponding to a category neuron in the converted SNN which has a maximum number of spikes in the spatial linear classification layer.

7. The system as set forth in claim 1, wherein the converted SNN is comprised of a pre-processing phase, a spike generation module, a plurality of convolution layers, a plurality of spatial linear sub-sampling layers, a spatial linear classification layer, and a spike counter module.

8. The system as set forth in claim 1, wherein to adapt the CNN to fit the set of requirements of the SNN, biases are removed from all convolution layers of the CNN.

9. The system as set forth in claim 1, wherein the adapt the CNN to fit the set of requirements of the SNN, spatial max-pooling layers of the CNN are replaced with spatial linear subsampling layers.

10. The system as set forth in claim 1, wherein the CNN comprises a pre-processing phase, a plurality of convolutional levels, and a spatial linear classification layer.

11. The system as set forth in claim 10, wherein each convolutional level in the plurality of convolution levels comprises a convolution layer, a sigmoid function layer, and a spatial max-pooling layer.

12. A method for converting convolutional neural networks to spiking neural networks for image recognition in a vehicle, comprising:

adapting a convolutional neural network (CNN) having an architecture to fit a set of requirements of a spiking neural network (SNN), resulting in an adapted CNN, wherein the adapted CNN comprises a plurality of layers having output values, and wherein to adapt the CNN to fit the set of requirements of the SNN, the output values in the plurality of layers are made non-negative;

using one or more processors and a non-transitory computer-readable medium having executable instructions encoded thereon to train the adapted CNN to obtain a set of learned weights; and applying the set of learned weights to a converted SNN having an architecture similar to the adapted CNN using the one or more processors; and classifying an input image captured proximate the vehicle using the converted SNN.

13. The method as set forth in claim 12, wherein the one or more processors further perform an operation of processing the converted SNN with the at least one input image until an expected output is obtained, wherein if an expected output is not obtained, then a set of parameters in the converted SNN is adjusted until the expected output is obtained.

14. The method as set forth in claim 13, wherein the CNN comprises a pre-processing phase, a plurality of convolutional levels, and a spatial linear classification layer, wherein each convolution level in the plurality of convolution levels comprises a convolution layer, a sigmoid function layer, and a spatial max-pooling layer, wherein to adapt the CNN to fit the set of requirements of a SNN, the method further comprises acts of:

removing biases from the convolution layers; and replacing the spatial max-pooling layers with spatial linear subsampling layers.

15. The method as set forth in claim 14, wherein to make the output values in the plurality of layers positive, the method further comprises an act of:

adding an abs( ) function after the pre-processing phase to ensure that input values to a convolution layer following the pre-processing phase are all non-negative.

16. The method as set forth in claim 15, wherein the converted SNN is comprised of a pre-processing phase, a spike generation module, a plurality of convolution layers, a plurality of spatial linear sub-sampling layers, a spatial linear classification layer, and a spike counter module.

17. The method as set forth in claim 16, wherein the spike counter module generates a classification output corresponding to a category neuron in the converted SNN which has a maximum number of spikes in the spatial linear classification layer.

18. The method as set forth in claim 12, wherein the converted SNN is comprised of a pre-processing phase, a spike generation module, a plurality of convolution layers, a plurality of spatial linear sub-sampling layers, a spatial linear classification layer, and a spike counter module.

19. A computer program product for converting convolutional neural networks to spiking neural networks for image recognition in a vehicle, the computer program product comprising:

computer-readable instructions stored on a non-transitory computer-readable medium that are executable by a computer having one or more processors for causing the processor to perform operations of:

training an adapted convolutional neural network (CNN) comprising a plurality of layers, having output values, to obtain a set of learned weights, the adapted CNN having an architecture that is adapted to fit a set of requirements of a spiking neural network (SNN), wherein to adapt the CNN to fit the set of requirements of the SNN, the output values in the plurality of layers are made non-negative:

applying the set of learned weights to a converted SNN having an architecture similar to the adapted CNN; and classifying an input image captured proximate the vehicle using the converted SNN.

* * * * *